US007026928B1

(12) United States Patent
Lane

(10) Patent No.: US 7,026,928 B1
(45) Date of Patent: Apr. 11, 2006

(54) PORTABLE PERSONAL SECURITY SYSTEM

(75) Inventor: Jody D. Lane, Dallas, TX (US)

(73) Assignee: Realty Times, Dallas, TX (US)

(*) Notice: Subject to any disclaimer, the term of this patent is extended or adjusted under 35 U.S.C. 154(b) by 344 days.

(21) Appl. No.: 10/393,860

(22) Filed: Mar. 21, 2003

(51) Int. Cl.
*B60R 25/10* (2006.01)
*G08B 23/00* (2006.01)
*G08G 1/123* (2006.01)
*H04Q 7/20* (2006.01)

(52) U.S. Cl. ............................ 340/539.13; 340/426.1; 340/573.1; 340/573.4; 340/988; 340/995.1; 455/456; 455/457

(58) Field of Classification Search ........... 340/539.13, 340/988–995, 573.1–573, 574, 426, 995.1; 455/456–457; 705/8
See application file for complete search history.

(56) References Cited

U.S. PATENT DOCUMENTS 4,763,349 A 8/1988 Siegel et al.
5,333,173 A 7/1994 Seazholtz et al.
5,497,149 A * 3/1996 Fast ........................... 340/988
5,852,408 A 12/1998 Christiansen et al.
5,868,135 A 2/1999 Kaufman et al.
5,963,136 A 10/1999 O'Brien
6,067,345 A 5/2000 Sasaki
6,130,620 A * 10/2000 Pinnow et al. ............. 340/5.86
6,150,942 A 11/2000 O'Brien
6,154,658 A 11/2000 Caci
6,198,695 B1 3/2001 Kirton et al.
6,230,006 B1 5/2001 Keenan et al.
6,239,700 B1 5/2001 Hoffman et al.
6,243,039 B1 6/2001 Elliot
6,263,259 B1 7/2001 Bartur
6,346,890 B1 2/2002 Bellin
6,359,557 B1 3/2002 Bilder
6,369,707 B1 4/2002 Neer
6,400,956 B1 * 6/2002 Richton .................. 455/456.3
6,408,172 B1 6/2002 Alperovich et al.
6,430,496 B1 8/2002 Smith et al.
6,441,731 B1 8/2002 Hess
6,442,241 B1 8/2002 Tsumpes
6,445,300 B1 9/2002 Luman
6,466,232 B1 10/2002 Newell et al.
6,466,796 B1 10/2002 Jacobson et al.
6,473,038 B1 10/2002 Patwari et al.
6,477,363 B1 11/2002 Ayoub et al.
6,480,529 B1 11/2002 Sih et al.
2002/0066037 A1 * 5/2002 Johnson ...................... 713/201
2003/0033183 A1 * 2/2003 Kawashima et al. ........... 705/8

* cited by examiner

*Primary Examiner*—Jeffery Hofsass
*Assistant Examiner*—Lam Pham
(74) *Attorney, Agent, or Firm*—Mollie E. Lettang; Daffer McDaniel, LLP

(57) ABSTRACT

A system which is adapted to provide a personal security system to a mobile individual is presented. In addition, a method for providing a security system to a mobile individual is presented as well as a method of using such a security system. In general, the method of providing a personal security system to a mobile individual using the system described herein may include receiving information regarding a set of different locations and corresponding time frames. In addition, the method may include transmitting a communication signal to a communication device during at least one of the time frames based upon a designated schedule. Subsequently, the method may include determining a subsequent course of action based upon whether a designated reply has been received in response to the transmitted communication. In some cases, the method may include notifying a responsive entity of location information upon failing to receive the designated reply.

46 Claims, 3 Drawing Sheets

PORTABLE PERSONAL SECURITY SYSTEM

BACKGROUND OF THE INVENTION

1. Field of the Invention

This invention generally relates to security systems, and more particularly to a security system for a mobile individual.

2. Description of the Related Art

The following descriptions and examples are not admitted to be prior art by virtue of their inclusion within this section.

In an effort to prevent crime, security systems are often installed within homes and businesses. Some systems may be adapted to sound an alarm upon detection of an intruder at a door or a window, notifying individuals inside and/or outside the home or business that an unwanted individual may have entered. In some cases, systems may be additionally or alternatively adapted to automatically notify emergency personnel, such as the police department of the region in which the home or business is located, for example. In this manner, help may be sent to the home or business quickly. In any case, such systems may serve as a personal security system for individuals in the home or business as well as a system to detect a burglary. Since such systems are generally configured to remain within the home or business, however, the systems may not offer security for individuals when they are away from the home or business.

For example, an individual walking alone at night or in a secluded area may desire to have a manner with which to sound an alarm and/or automatically contact emergency personnel upon being attacked. In other cases, individuals who travel or are often in locations in which security systems are not installed or activated may desire a personal security system. For example, a real estate agent is often traveling to and entering a variety of homes to show to potential buyers. Even if the homes have security systems, they are often deactivated such that the real estate agent may enter the home without delay and without activating the alarm. In addition, real estate agents often conduct open houses, allowing any individual access to a house and, thus, access to the real estate agent and the property within the house without activating a security system alarm. The absence of a security system, in either situation, makes the real estate agent particularly vulnerable to burglars and attackers. In other cases, individuals who need the attention of responsive personnel at unexpected times may want a personal security system. For example, individuals with certain medical conditions or elderly individuals may desire such a system.

As such, in some cases, individuals may choose to carry devices which sound an alarm when activated such that someone nearby may respond. For example, a person may carry a whistle to blow when danger is imminent. In other cases, an individual may carry an electronic device configured to alarm upon pressing a button, such as those included on automobile keyless entry remotes, for example. In either case, however, the devices only aid in notifying people in the remote area of the individual in danger. Consequently, the individual in distress is dependent on individuals actually being in the remote area and the responsive nature of those individuals. Furthermore, the devices may be taken or knocked out of possession of an individual before the device can be used or activated. As a result, responsive personnel may not be alerted to aid the victim in some embodiments. In addition, the individual may be separated from the device, such that even if the device alarms and a responsive entity is contacted, it may be difficult to locate the individual.

Accordingly, it may be advantageous to develop a method and a system which monitors the safety of an individual and automatically contacts responsive personnel in an event in which the individual may be in danger. In particular, it may be beneficial to develop a system which contacts a responsive entity upon receiving a distress signal or upon failing to receive communication from an individual. In addition, it may be advantageous for the system to be easily portable, such that the system may be used anywhere and at any time. Moreover, it may be advantageous to develop a personal security system which is aware of an individual's schedule and/or personal information such that information specific to the individual may be communicated to a responsive entity in an event of an emergency.

SUMMARY OF THE INVENTION

The problems outlined above may be in large part addressed by a system which is adapted to provide a personal security system to a mobile individual. In addition, a method for providing a security system to a mobile individual is contemplated herein as well as a method of using such a security system. In general, the system described herein may include a means for receiving and storing information regarding one or more different locations and corresponding time frames. In addition, the system may include a means for transmitting communication signals to a communication device during at least one of the time frames and at predetermined intervals. In particular, the system may include a means for initiating communication links with a communication device. In a preferred embodiment, the means for transmitting communication signals may be further adapted to receive communication signals from the communication device. In this manner, the system may be adapted to maintain a communication link with the communication device until receiving a termination signal or a designated reply.

In a preferred embodiment, the communication device may be in the vicinity of the mobile individual. Consequently, in some embodiments, the communication device may include a portable electronic communication device. More specifically, the communication device may include a device which is configured to operate in a wireless mode in some embodiments. For example, the communication device may include a wireless telephone, pager, personal digital assistant or a laptop or notebook computer. Alternatively, the communication device may include a device which is adapted to solely operate from power directly supplied or converted from an alternating current source.

In either case, the method described herein for providing a security system may include receiving information regarding one or more different locations and corresponding time frames as well as transmitting a communication signal to a communication device during at least one of the time frames based upon a designated schedule. In particular, step of transmitting the communication signals from the security system may include initiating an interactive link with the communication device. In some cases, the step of transmitting may include periodically transmitting a communication signal to the communication device. In alternative embodiments, the step of transmitting may include transmitting a communication signal at substantially non-uniform intervals. In either case, the designated schedule of the transmission of the communication signals may be selected by the mobile individual or an entity representing the individual. In yet other embodiments, however, the system may include a means of determining the designated schedule based upon stored information. As such, in some embodiments, the method for providing a security system to a mobile individual may include determining a designated schedule for the transmission of communication signals to the communication device.

In any case, the method may further include determining a subsequent course of action based upon whether a designated reply has been received in response to the transmitted communication signal. Such a designated reply may include a coded communication signal or a verbal acknowledgement communicated from a user of the communication device. In either case, the subsequent course of action may include communicating location information, directly from the security system in some embodiments, to a responsive entity upon failing to receive the designated reply. As such, the system may further include a means for notifying and communicating location information to a responsive entity. The failure to receive a designated reply may include receiving a distress reply or no reply at all after a predetermined amount of time. In some embodiments, the method may retransmit the communication signal to the communication device prior to notifying the responsive entity. Upon failing to receive the designated reply again, however, the method may continue onto communicating the location information to the responsive entity. In yet other embodiments, the subsequent course of action may include not communicating location information to the responsive entity upon receiving the designated reply. For example, in some cases, the subsequent course of action may include waiting a predetermined length of time before transmitting a communication signal back to the communication device. In yet other embodiments, the subsequent course of action may include communicating to an entity that the mobile individual is safe.

In the event a designated reply is not received, the step of communicating location information to a responsive entity may include communicating a location associated with a time frame in which the communication signal was transmitted. In yet other embodiments, the step of communicating may additionally or alternatively include communicating a location of the communication device. In such an embodiment, the method may include determining and/or tracking a location of the communication device. Consequently, in some cases, the communication device may include a global positioning system. In addition, the system may include a means to track the communication device. In such an embodiment, the system may further include a means for comparing the location of the communication device with a location specified for a particular time frame. In this manner, the method may include determining whether the communication device is a predetermined distance from the specified location and transmitting a communication signal to the communication device upon such a determination. In yet other embodiments, the method may additionally or alternatively include notifying a responsive entity upon such a determination.

In general, the responsive entity may include any entity which is able to respond upon receipt of notification from the security system. For example, in some cases, the responsive entity may include a relative, a friend, a neighbor, and/or any other entity which may be able to render care to the mobile individual. In addition or alternatively, the responsive entity may include a 911 public safety answering point (PSAP) associated with the location information. In such an embodiment, the method may further include obtaining the 911 PSAP prior to the step of notifying the responsive entity. Consequently, the system described herein may, in some embodiments, include a means for obtaining a 911 PSAP. In some cases, the system may additionally or alternatively include a means to determine an address of an establishment. In this manner, the names of an establishment may be used to specify location information regarding the schedule of the mobile individual. In a preferred embodiment, the method may include determining an address corresponding to an establishment name prior to the step of communicating location information to the responsive entity.

In some cases, the method may include receiving updated information regarding the set of different locations and corresponding time frames. More specifically, the method may include adjusting the designated schedule upon receiving the updated information. In addition or alternatively, the method may include receiving a termination signal to cancel the transmission of communication signals. In either case, the step of receiving may include receiving the information from a user of the communication device. Alternatively, the step of receiving may include receiving the information from an entity other than a user of the communication device. In some cases, the method may further include receiving information related to a user of the communication device. For example, the method may include receiving physical, historical or medical information specific to the mobile individual. In this manner, the means for receiving and storing information within the system may be further adapted to receive and store information specific to the mobile individual. In general, the receipt of information to the system may be in written, verbal and/or electronic form. In addition, the manner in which information is communicated to the responsive entity may be in written, verbal and/or electronic form. Consequently, the system may include a means to transfer information to the responsive entity in written, verbal, and/or electronic form.

As noted above, a method for using a portable security system is also contemplated herein. Such a method may include communicating to a security service system a schedule of engagements arranged at locations remote from the security service system. In addition, the method may include acknowledging receipt of signals transmitted from the security service system to a portable electronic communication device during a time frame specified for at least one of the engagements. In some embodiments, the method may further include designating a schedule for the transmission of signals and/or one or more responsive entities to be notified in a case of an emergency.

In general, the system described herein may be used to provide a personal security system to any individual. For example, the system may be particularly desirable for a person who travels alone and/or to remote locations, such a real estate agent, for example. As such, a method for assuring the safety of a real estate agent is also contemplated herein. In particular, a method is provided which includes initiating a plurality of interactive links between the real estate agent and a security service system by transmitting communication signals from the security service system to a portable electronic communication device in the vicinity of the real estate agent at predetermined times. In addition, the method may include receiving acknowledgement of the communication signals. In some cases, the method may further include notifying a responsive entity upon failing to receive a designated reply from the real estate agent.

There may be several advantages to using the system and methods described herein. In particular, the system described herein provides a manner with which to monitor the safety of an individual at any time and at any location. Consequently, an individual who travels may be provided with a security system. In addition, the system described herein provides a manner with which to notify a responsive entity upon indicating the safety of the individual is uncertain or is in jeopardy. In particular, the system provides a manner with which to notify a responsive entity which is specifically associated with the location of the individual. In this manner, aid may be rendered to the individual in a fast and efficient manner. Furthermore, the system advantageously allows the individual to specify the time and criteria by which to monitor their safety.

BRIEF DESCRIPTION OF THE DRAWINGS

Other objects and advantages of the invention will become apparent upon reading the following detailed description and upon reference to the accompanying drawings in which.

Figure 1:
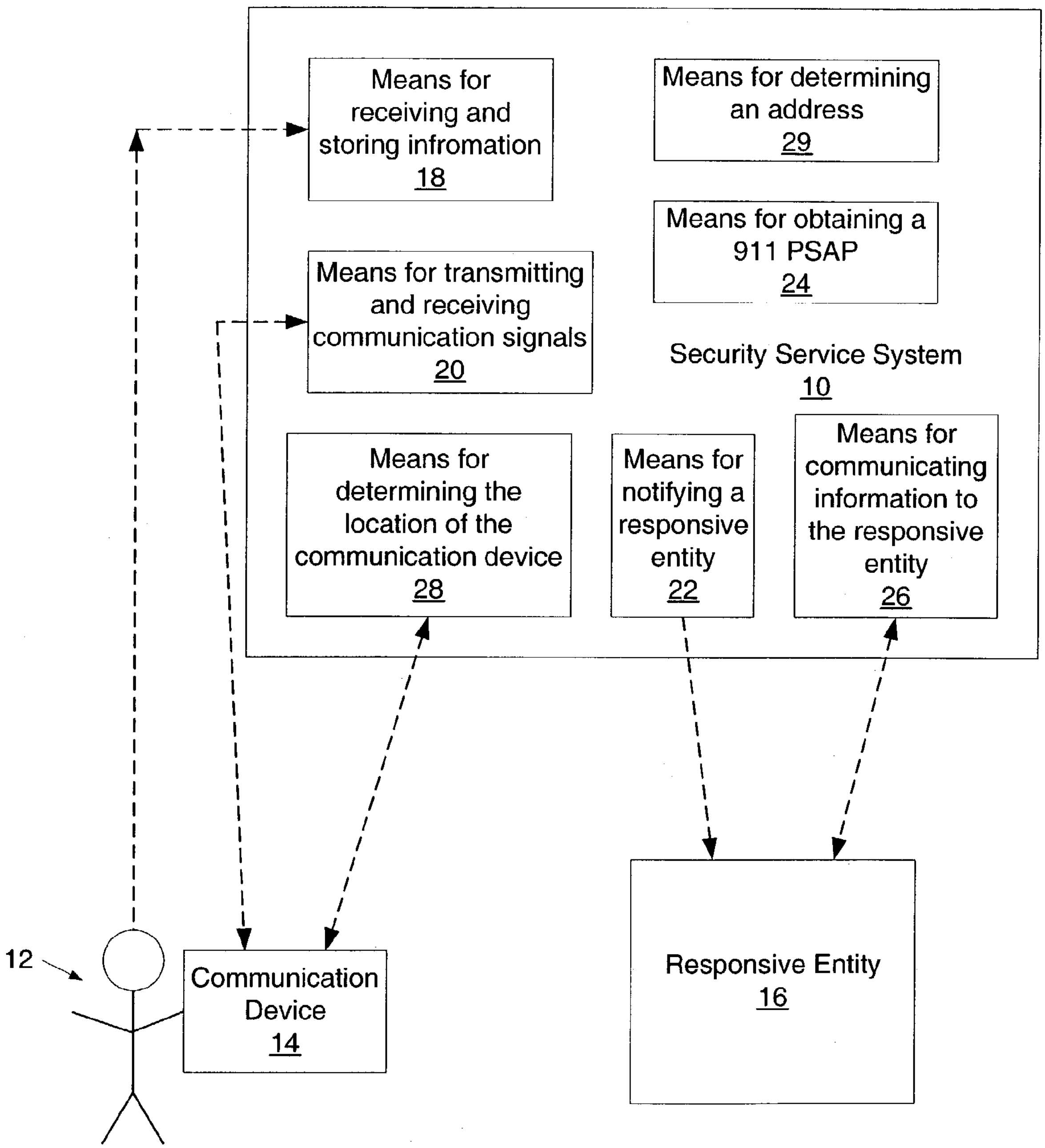
FIG. 1 depicts a schematic diagram of a portable personal security system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
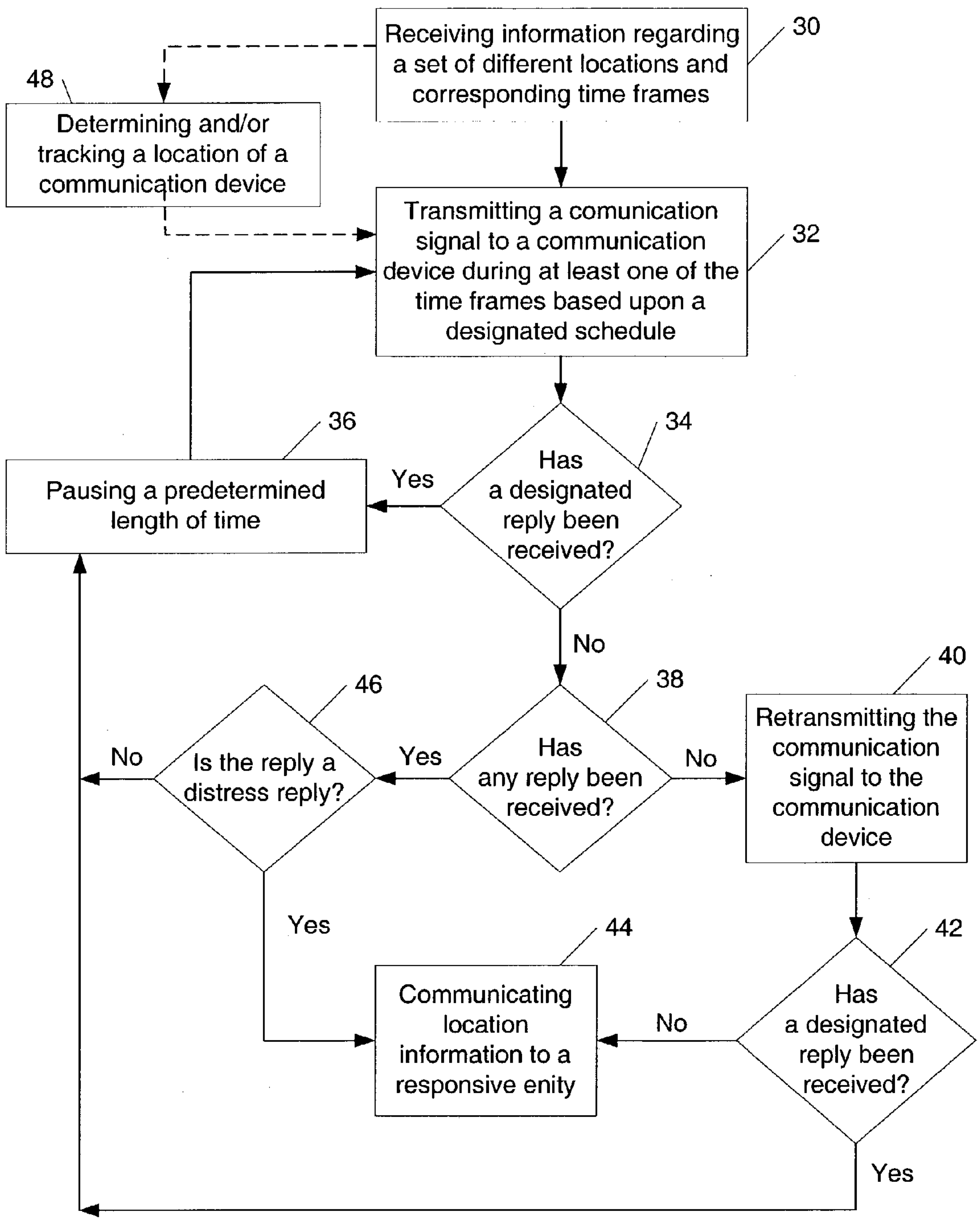
FIG. 2 depicts a flow chart for providing the security system of FIG. 1 to a mobile individual.
Figure 3:
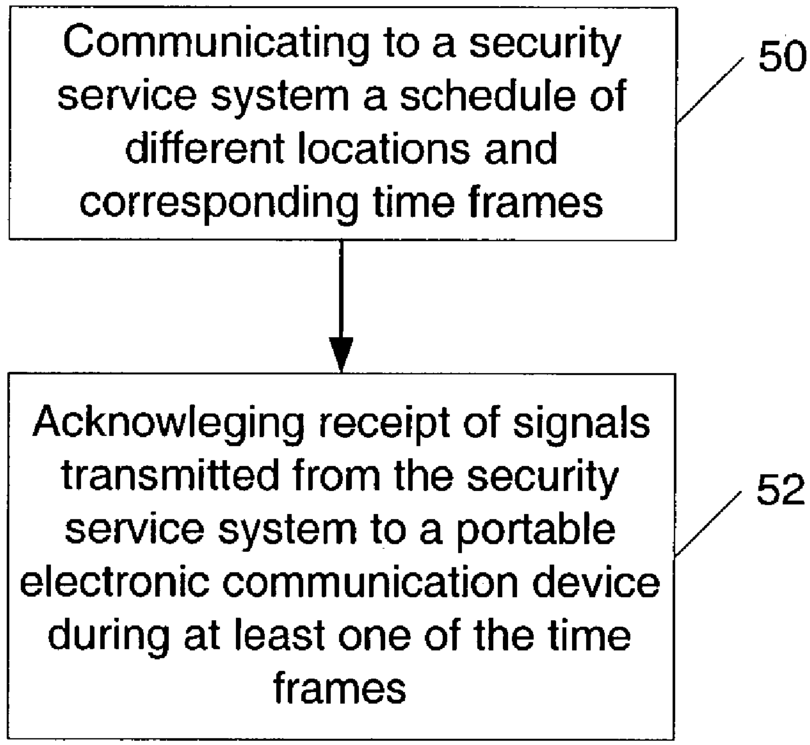
FIG. 3 depicts a flow chart for using the security system of FIG. 1.

Turning to the drawings, a security system for a mobile individual and exemplary methods for providing and using such a system are illustrated in FIGS. 1–3. In particular, FIG. 1 illustrates security service system 10 including means with which to monitor the safety of mobile individual 12 and a means for notifying and communicating information to responsive entity 16 when the safety of the mobile individual is uncertain. As shown by the dotted lines in FIG. 1, security service system 10 may be communicably coupled to responsive entity 16 and communication device 14. As will be explained in more detail below, the coupling of security service system 10 to communication device 14 may not be continuous, but rather may depend upon the schedule set for the transmission of communication signals to the device and/or the receipt of a communication signal from the device. Similarly, the coupling of security service system 10 to responsive entity 16 may not be continuous, but may depend on the determination of whether a responsive entity needs to be notified.

In general, the system described herein may be used to provide a personal security system to any individual. In particular, the system may be advantageous for a mobile individual who desires to have their safety monitored at different locations. For example, in some embodiments, a person who travels alone and/or to remote locations may desire to a have a personal security system. For instance, a real estate agent, a salesperson, or anyone who travels for their job may desire to have a personal security system. In other cases, an individual who finds themselves in a location or a situation in which they feel their safety is in jeopardy may desire to have a mobile personal security system. In addition, elderly individual or a person with a particular medical condition may desire to have a portable personal security system. In yet other cases, a parent may desire to have a personal service security system for their child, especially for a teenager who is particularly mobile and active. In this manner, the parent may have a sound peace of mind that their child is safe and the child may experience a degree of independence from the parent. As such, the system and methods described herein may be used for a variety of scenarios and mobile individual 12 may include a variety of person or persons.

As shown in FIG. 1, communication device 14 may be in the vicinity of mobile individual 12. More specifically, communication device 14 may be in a location such that mobile individual 12 is able to acknowledge communication signals transmitted from security service system 10 in a timely manner, such as within approximately 20 seconds, for example. In general, the time increments with which to acknowledge the receipt of such communication signals may depend on the parameters specified for the personal security service system and, therefore, may be longer or shorter than 20 seconds in some embodiments. As explained in more detail below, circumstances which cause mobile individual 12 to fail to acknowledge receipt of such communication signals may indicate that the safety of the individual is in jeopardy, causing security service system 10 to notify responsive entity 16. Consequently, in some cases, communication device 14 may be a portable device. For example, communication device 14 may be a portable electronic communication device which has the ability to operate in a wireless mode. Alternatively stated, communication device 14 may be a portable electronic communication device which has the ability to operate on battery power.

For instance, in some embodiments, communication device 14 may include a wireless telephone, a pager or a wireless computer, such as a personal digital assistant, laptop or notebook computer. Alternatively, communication device 14 may include a wireless unit which is configured exclusively for the receipt of communication signals from security service system 10, as explained in more detail below. As is well known, in some embodiments, wireless devices may operate via a wire connection to an alternating current source as well as by battery power. As such, the method described herein for providing a security system to a mobile individual is not restricted to communication device 14 operating in a wireless mode. A communication device adapted for wireless operation may simply allow the method described herein to be conducted such that a security system may be provided to an individual at any location regardless if an alternating current source is available.

In some embodiments, however, communication device 14 may not be configured to operate in a wireless mode. In other words, communication device 14 may include a device which is adapted to operate solely on power directly supplied from an alternating current source or from direct current converted from an alternating current source. For example, communication device 14 may include a desktop computer, landline telephone, or another communication device which is generally arranged in a fixed location. In other embodiments, communication device 14 may include a wired unit which is adapted for receiving communication signals solely from security service system 10. In such an embodiment, communication device 14 may exclusively serve as a component of a personal security system. In other embodiments, however, communication device 14 may be used for a plurality of functions, including but not limited to connection with security service system 10. For example, communication device 14, in some embodiments, may be used for communication to and/or from entities other than and including security service system 10. In addition or alternatively, communication device 14 may be used for tasks which do not include the transmission of communication signals, such as computational or organizational tasks often associated with the use of a computer. In any case, it is noted that the aforementioned adaptations of communication device 14 serving exclusively as a component of the personal security system or being used for a plurality of functions may be included within wireless or wired configurations of communication device 14.

In general, security service system 10 may be configured to operate with any communication device in the vicinity of mobile individual 12. Consequently, security service system 10 does not necessarily have to supply a communication device to mobile individual 12 in order to offer a personal security system. Rather, mobile individual 12 may supply communication device 14. In other cases, however, security service system 10 may supply communication device 14 to mobile individual 12. Alternatively, an entity other than mobile individual 12 or security service system 10 may supply communication device 14 to mobile individual 12. Such an entity may include an employer or relative of mobile individual 12, for example. In any case, communication device 14 may be a personal device of mobile individual 12. In other words, communication device 14 may be a device which is primarily used, and in some embodiments, owned by mobile individual 12.

In an alternative embodiment, communication device 14 may be temporarily assigned to mobile individual 12. As such, communication device 14 may be a device which is used by a plurality of people. Such a temporary assignment may be location or time frame specific, depending on the use of the personal security system. In particular, a communication device positioned at a particular location may be temporarily assigned to mobile individual 12 for instances in which the individual is expected to be at such a location. In addition or alternatively, a communication device may be assigned to mobile individual 12 during a period of time, allowing the individual to access security service system 10 from a plurality of locations. In some cases, the period of time may be dependent upon certain conditions, such as length of employment, for instance. In other embodiments, the period of time may be specific, such as for one or more hours, days, weeks, or months, for example.

As noted above, security service system 10 may include means with which to monitor the safety of mobile individual 12 and a means for notifying and communicating information to responsive entity 16 when the safety of the mobile individual is uncertain. The details of such means are discussed below in reference to FIG. 1 as well as FIGS. 2 and 3. FIG. 2 outlines an exemplary method of providing a personal security system to mobile individual 12 from the viewpoint of security service system 10. FIG. 3, on the other hand, illustrates a method of using such a system from the viewpoint of mobile individual 12. As discussed in more detail below, the security system and methods described herein are not restricted to the configurations illustrated in FIGS. 1–3. In particular, security service system 10 in FIG. 1 may include fewer or more means with which to offer a personal security system to a mobile individual. In addition or alternatively, the methods depicted in FIGS. 2 and 3 may include fewer or more steps with which to provide and/or use such a personal security system.

As shown in FIG. 1, security service system 10 may include means 18 with which to receive and store information. As described below in reference to step 30 in FIG. 2, the information may be in regard to one or more locations and corresponding time frames, or any other information specific to mobile individual 12. In general, means 18 may include any storage medium with which to collect and keep information. For example, in some embodiments, means 18 may include a storage medium with program instructions executable by a computer. More specifically, means 18 may include a read-only memory, a random access memory, a magnetic or optical disk, or a magnetic tape. In addition or alternatively, means 18 may include a means with which to manually receive and/or record information. For example, means 18 may include an individual with which to receive and/or record information.

In any case, means 18 may include one or more storage mediums. In some cases, it may be desirable for means 18 to include a single storage medium to simplify the configuration of security system 10. In yet other cases, it may be desirable for means 18 to include more than one storage medium such that back-up data may be made available. In either case, means 18 may be communicably coupled to a source of information through a transmission medium such as a wire, cable, or wireless transmission link. In this manner, information may be provided from a location remote from security service system 10. In some cases, the information may be provided by mobile individual 12 and more specifically, through communication device 14. In other embodiments, however, the information may be provided from mobile individual 12 using a different means of communication. In yet other cases, the information may be provided from an entity other than mobile individual 12, such as an employer or an assistant of mobile individual 12, for example.

As shown in FIG. 2, step 30 may include receiving information regarding one or more locations and corresponding time frames. In some embodiments, at least one of the locations may be different from another. As noted above, the received information may be specific to a mobile individual 12. More specifically, the information may reflect the schedule of mobile individual 12, including work engagements, travel itineraries, and/or personal agendas of the individual. For instance, in an embodiment in which mobile individual 12 is a real estate agent, the information may include locations of homes to be shown by the real estate agent as well as the time frames during which the agent expects to be at such locations.

In some cases, the location information received in step 30 may include an address or a code corresponding to a particular address. In yet other embodiments, however, the location information may include a name of an establishment. In such a case, it may be advantageous for security service system 10 to be able to obtain the address of the establishment such that in the event the safety of mobile individual 12 is uncertain, a sufficient amount of information may be provided to responsive entity 20 to find and render aid to mobile individual 12. As such, in some cases, security service system 10 may include means 29 for determining an address for given location information. In general, means 29 may include any system or method with which to obtain address information corresponding to names of establishments. For example, in some embodiments, means 29 may include a database including establishment names and corresponding addresses and a means of accessing such a database. In some embodiments, the database may be accessed via a transmission medium, such as through a wire, cable, or wireless transmission link. In other cases, the database may be manually accessed.

As noted above, the information received in step 30 may be provided by mobile individual 12. As such, the flowchart in FIG. 3 includes step 50 in which a schedule of different locations and corresponding time frames are communicated to security service system 10. In an alternative embodiment, however, the information may be provided by an entity other than mobile individual 12, such as an assistant or an employer of the mobile individual. In any case, the communication of information in step 50 may be transmitted via verbal instructions, DTMF tones, written instructions and/or pictures. In addition, information may be communicated in person, over a telephone (i.e., verbally or through an automated touch-tone system), via facsimile, through email, via a web-based link, or any other known method of communication. Consequently, information may be provided in a written manner, verbally and/or electronically. It is noted that, in some cases, electronic means may be used to convey written and verbal communication. As such, in some embodiments, the method of communication may be described as both verbal and electronic or written and electronic. In other cases, the method of communication may be described in all three manners, as written, verbal and electronic. In yet other embodiments, however, the descriptions of written, verbal and electronic communication may be mutually exclusive.

In some embodiments, step 50 of FIG. 3 may further include communicating other information specific to mobile individual 12. As such, step 30 of FIG. 1 may include receiving additional information specific to mobile individual 12 in some embodiments. For example, in some cases, steps 60 and 30 may respectively include communicating and receiving a physical description of mobile individual 12 or a vehicle driven by mobile individual 12. In addition or alternatively, steps 60 and 30 may respectively include communicating and receiving information about individuals who have threatened to harm mobile individual 12 in the past. Such physical and historical information may advantageously aid responsive entity 16 in locating mobile individual 12 in an embodiment in which the individual is missing (i.e., is in a location different than communication device 14 or a location different from the one recorded for a given time frame, as explained in more detail below). In yet other embodiments, steps 60 and 30 may respectively include communicating and receiving medical information specific to mobile individual 12. Such information may be particularly helpful in rendering aid to an elderly person or an individual with a pre-existing medical condition.

In general, any information specific to mobile individual 12 with the exception to the location and time frame information described in reference to step 30 may be communicated and received during any part of the methods depicted in FIGS. 2 and 3, respectively. More specifically, the communication and receipt of physical, historical, and/or medical information may not be restricted to being conducted during steps 60 and 30. As such, in some embodiments, information may be communicated and received prior to, during and/or subsequent to steps 60 and 30. In addition, security service system 10 may be adapted to retain the information such that the information is available for reference during any time period in which security service system 10 is designated to monitor the safety of mobile individual 12. More specifically, security service system 10 may include a means with which to store general information specific to mobile individual 12 such that the information may be communicated to responsive entity 20 at any time upon indicating the safety of the individual is uncertain. Such a means may be included within means 18 or may be distinct from means 18.

As shown in FIG. 2, the method of providing a personal security system to mobile individual 12 may further include step 32 in which a communication signal is transmitted to communication device 14 during at least one of the time frames received in step 30. In general, the transmission of the communication signal may be based upon a designated schedule. More specifically, a designated schedule may outline the one or more time frames selected for the transmission of the communication signal. In addition, the designated schedule may outline the occurrence at which the communication signals are transmitted to communication device 14 throughout the method depicted in FIG. 2. In particular, the designated schedule may specify the length of intermission between transmissions of communication signals. Exemplary lengths of times for such intermissions are discussed in more detail below in reference to step 36.

In some cases, the designated schedule may be received along with the information regarding the location and time frames in step 30. In other words, the designated schedule may be communicated during step 50 in FIG. 3. In this manner, the entity communicating the location and time frame information to security service system 10 may specify the designated schedule and, consequently, control the amount of monitoring provided by security service system 10. In yet other cases, the designated schedule may not be communicated during step 50. In particular, the designated schedule may be communicated at a time distinct from step 50. In some cases, the designated schedule may be set by an entity other than the entity specifying the location and time information in step 50. For example, in some cases, a teenager who uses security service system 10 may communicate their location and time frame information as described in reference to step 50 and their parent may communicate the designated schedule by which to monitor the teenager. In such a case, security service system 10 may be further adapted to prevent the teenager from modifying the designated schedule set by the parent. Alternatively, security service 10 may be adapted to allow the teenager to modify or even set the designated schedule. In any case, the designated schedule may be communicated in written form, verbally and/or electronically. In some cases, the designated schedule may be communicated in the form of a code corresponding to a predetermined designated schedule stored within security service system 10. Such a manner of communication may allow the designated schedule to be set more quickly, making the task of communicating information to security service system 10 more efficient.

In yet other embodiments, the designated schedule may not be communicated to security service system 10. Rather, security service system 10 may be adapted to determine the designated schedule based upon the location and time information communicated and received in step 30. Such a determination of the designated schedule by the security service system 10 may follow predetermined guidelines set by the security service system 10, mobile individual 12 or an entity representing mobile individual 12. For instance, in some cases, security service system 10 may set a designated schedule based upon a location specified in step 30. For example, a real estate agent may communicate to security service system 10 a location of a home at which the agent will be having an open house or will be privately showing to potential buyers. In turn, security service system 10 may be adapted to assess the remoteness and/or safety of the location and set an appropriate rate of transmission of communication signals during the time frame at which the real estate agent expects to be at the location. Alternatively, the real estate agent may communicate guidelines for security service system 10 to set the rate of transmission of communication signals within the designated schedule. In either case, security service system 10 may set a different designated schedule for each of the locations specified in step 30. Alternatively, security service system 10 may set the same designated schedule for each of the locations specified in step 30. In other embodiments, security service system 10 may set the designated schedule based upon the time frames specified in step 30. For example, a designated schedule with a relatively high rate of transmission of communication signals may be set for a time frame slotted in late night hours as compared to a time frame slotted in daylight hours.

As stated above, the communication signal in step 32 may be transmitted during at least one of the time frames received in step 30 based on the designated schedule. As such, the communication signal may be transmitted during each of the time frames, in some embodiments. In other cases, the communication signal may be transmitted during less than all of the time frames received in step 30. For example, in some cases, mobile individual 12 may desire to have security service system 10 be aware of a plurality of engagements, but may only desire monitoring during time frames of some of the engagements. For instance, security service system 10 may receive location and time frame information of mobile individual 12, including meetings located in remote locations and a lunch date with a friend in-between the meetings. In some cases, mobile individual 12 may feel that their safety does not need to be monitored during the lunch date since he/she will be in the company of a friend. However, mobile individual 12 may feel the need to have security service system 10 monitor their safety during the meetings before and after the lunch date.

The capability of differentiating when the communication signal is transmitted offers more flexibility to mobile individual 12 with regard to selecting when to use the personal security system described herein. In addition, the capability of differentiating when the communication signal is transmitted allows security service system 10 to offer a more effective personal security system to mobile individual 12, in some embodiments. In particular, if mobile individual 12 fails to reply to a transmitted communication signal during a designated time frame, security service system 10 may communicate to responsive entity 16 the intended locations of the individual prior to such a time frame in addition to the location information associated with the time frame of the transmitted communication signal. In this manner, if mobile individual 12 fails to show up at a location associated with the designated time frame, responsive entity 16 may have knowledge of individual's prior whereabouts. For example, in the event mobile individual 12 is in a car accident in-between locations specified in step 30 and is rendered unable to acknowledge the receipt of communication signals to communication device 14, responsive entity 16 may have information to look for the individual between the two specified locations. As a result, care may be rendered to mobile individual 12 more quickly than if a prior location of the individual was unknown.

In any case, step 32 in FIG. 2 may, in some embodiments, include initiating a communication link between security service system 10 and mobile individual 12, or more specifically, communication device 14. In other words, step 32 may include transmitting a communication signal to communication device 14 without receiving a communication signal from communication device 14 first. In this manner, security service system 10 may monitor the safety of mobile individual 12 without having the individual initiate the communication link. "Communication link," as used herein, may refer to the connection between two devices which enables the transfer of communication. As such, "initiation of a communication link," as used herein, may refer to the attempt to establish a communication link between two devices.

In other embodiments, however, mobile individual 12 may initiate the communication link between communication device 14 and security service system 10. For example, in embodiments in which mobile individual 12 needs help or is uncertain about his/her safety, the individual may initiate a communication link between communication device 14 and security service system 10. In some cases, the communication link may be sustained until mobile individual 12 feels safe in his/her environment or until aid is rendered to the individual. In other embodiments, the initiated communication link may be used to set up a designated schedule of transmitting communication signals for a time period in which mobile individual suspects he/she will need monitoring. In yet other embodiments, mobile individual 12 may initiate a communication link between communication device 14 and security service system 10 in order to modify the information stored within security service system 10, including the location, time frame and/or designated schedule information received in step 30 as well as any other information specific to mobile individual 12. In other embodiments, mobile individual 12 may initiate a communication link between communication device 14 and security service system 10 in order to cancel the transmission of communication signals during a designated time frame.

Regardless of whether security service system 10 or mobile individual 12 initiates the communication link between the security service system 10 and communication device 14, security service system 10 may include means 20 for transmitting and receiving communication signals. In general, means 20 may be adapted to send and accept communication signals. More specifically, means 20 may be adapted to send and, in some embodiments, accept communication signals from communication device 14. As discussed in more detail below in reference to step 40, in some embodiments, communication device 14 may not be configured to transmit communication signals. Consequently, in such an embodiment, means 20 may be configured to receive communication signals from a communication device other than communication device 14. In some embodiments, means 20 may be adapted to send and accept communication signals from any communication device. In this manner, security service system 10 may be adapted to receive communication signals in any format. In general, means 20 may include one or more communication devices. For example, means 20 may include a telephone, a computer with a web-based communication link, or any other device to which a communication signal can be received. In addition, means 20 may be communicably coupled to communication device 14 and any other communication device through a transmission medium such as a wire, cable, or wireless transmission link. Consequently, means 20 may include wired and/or wireless communication devices.

As noted above, the communication signal transmitted to communication device 14 may be verbal or electronic. As such, in some embodiments, means 20 may include a means with which to communicate a message to mobile individual 12. For example, in cases in which communication device 14 includes a pager, means 20 may include a means with which to communicate an electronic message via the pager.

In yet other embodiments, means 20 may include a means with which to communicate a verbal message to mobile individual 12 upon acknowledgement of the receipt of the communication signals transmitted to communication device 14. In particular, means 20 may include an automated voice messaging system and/or a live operator with which to communicate a verbal message. Such a message may be an inquiry as to the safety of the individual, for example. In other embodiments, the message may ask for a code to be transmitted to verify the safety of mobile individual 12. Several other messages may also or alternatively be communicated to mobile individual 12, depending on the design characteristics of security service system 10.

In some cases, means 20 may be adapted to swap between an automated means of communicating to mobile individual 12 and a live means of communicating to the mobile individual. For example, in cases in which mobile individual 12 indicates that their safety is uncertain through a distress response as described in more detail below with respect to step 46, means 20 may be adapted to switch to a live operator. Such an adaptation may be particularly advantageous in embodiments in which 911 emergency personnel are contacted since the general protocol upon receiving a 911 call is to ask a series of questions regarding the emergency. In addition or alternatively, such an adaptation of means 20 may offer an extra level of comfort to mobile individual 12 during the time they are uncertain about their safety. In particular, having a live operator with which to communicate with may allow mobile individual 12 to feel more secure.

Subsequent to transmitting a communication signal to communication device 14, the method of FIG. 2 may continue to step 34 in which a subsequent course of action is determined based upon whether a designated reply has been received in response to the transmitted communication signal in step 32. In particular, step 34 may lead to step 36 upon receiving a designated reply. Alternatively, step 34 may lead to step 38 upon failing to receive a designated reply. In general, the receipt of a designated reply may coincide with step 52 in FIG. 3 in which receipt of communication signals transmitted from security service system 10 are acknowledged by mobile individual 12. Such an acknowledgement may include transmitting an electronic signal, verbal communication and/or written communication to security service system 10.

In some cases, mobile individual 12 may acknowledge the receipt of a transmitted communication signal via communication device 14. For example, in an embodiment in which communication device 14 includes a telephone, mobile individual 12 may acknowledge the receipt of the communication signal by answering the telephone and, in some embodiments, communicating a coded message either verbally or through DMTF tones. In any case, the designated reply may include a communication signal from communication device 14. In yet other cases, however, the designated reply may not originate from communication device 14. For example, in an embodiment in which communication device 14 does not have ability to transmit a communication signal, such as with a pager, for example, the designated reply may be transmitted from a communication device distinct from communication device 14. Such a device may include a telephone or a computer distinct from that of communication device 14. In other cases, the distinct device may be adapted to exclusively transmit a communication signal directly to security service system 10. In either case, the distinct device may either be wired or wireless.

As stated above and as shown in FIG. 1, upon receiving a designated reply in step 34, the method may continue to step 36 and furthermore back to step 32. In general, step 36 may delay the transmission of a communication signal from security service system 10 to communication device 14 a predetermined length of time. Such a predetermined length of time may be included within the designated schedule referred to in step 30 above. As such, the predetermined length of time may, in some embodiments, be designated by mobile individual 12 and be received by security service system 10 upon receiving the location and time frame information in step 30. Alternatively, the predetermined length of time may be received at a time other than when the location and time frame information is received. In yet other embodiments, security service system 10 may determine the length of time step 32 is delayed from step 36. Such determination by security service system 10 may be made by criteria previously submitted to security service system 10 or by criteria determined by the security service system. For example, in some cases, mobile individual 12 may communicate guidelines for security service system 10 to set the length of time step 32 is delayed from step 36. Alternatively, security service system 10 may be adapted to determine the amount of time to delay step 32 from step 36 by assessing the location and/or time frame information received in step 30. Exemplary methods of security service system 10 determining the occurrence of communication signals transmitted within the method of FIG. 2 are described in more detail above in reference to the determination of the designated schedule.

In any case, the predetermined length of time in step 36 may include any interval of time. In some cases, it may be desirable to have the predetermined length of time range from less than approximately 1 minute to approximately 10 minutes, particularly when the safety of mobile individual 12 is uncertain. In other embodiments, however, a range between approximately 10 minutes and approximately 30 minutes may be desirable. In yet other cases, a predetermined length of time greater than approximately 30 minutes may be desirable. In some embodiments, step 36 may delay subsequent step 32 with a substantially similar predetermined length of time such that a periodic transmission of communication signals may be sent to communication device 14. In this manner, communication device 14 may receive communication signals at a substantially uniform frequency. In other cases, however, the predetermined lengths of time set for step 36 may be substantially nonuniform. For example, mobile individual 12 may choose to decrease the amount of time subsequent step 32 is delayed from step 36 during a designated time frame. Such a decreasing sequence may insure that security service system 10 is adequately monitoring the safety of mobile individual 12 at the start of the designated time frame while not having to transmit communication signals at the same frequency at a later time in the designated time frame.

Returning to step 34 of FIG. 2, cases in which a designated reply is not received in response to the communication signal transmitted in step 32, the method may continue to step 38 in which a determination of whether any reply has been received in response to the transmission of the communication signal is conducted. In particular, upon receiving a response other than a designated reply as described above in reference to step 34, the method may continue to step 46 in which a determination of whether the reply is a distress reply is conducted. In general, a "distress reply," as used herein, may refer to any response from mobile individual 12, communication device 14, and/or any other communication device which indicates that the safety of mobile individual 12 is uncertain. In some cases, a distress reply may include a verbal communication from mobile individual 12 directly communicating that help is needed. In other embodiments, the distress reply may include a designated distress response, such as a code designated for indicating that help is needed. Such a designated distress code may be communicated verbally from mobile individual 12 and/or electronically from communication device 14 or any other communication device. Regardless of the type of distress reply received, security service system 10 may be adapted to stay in communication with mobile individual 12 until the communication link between the two entities is terminated. In this manner, mobile individual 12 may be able to communicate information regarding his or her situation to security service system 10 and, thereby, provide more information to responsive entity 16.

As shown in FIG. 2, upon receipt of a distress reply, the method may continue to step 44 in which location information is communicated to responsive entity 16. Such a step is described in more detail below. In the event that no distress reply is received, however, the method may continue to step 36 in which the transmission of a subsequent communication signal to communication device 14 is delayed for a predetermined length of time. Such a course of action may be upon receipt of a reply which indicates mobile individual 12 is safe, but is different than the designated reply described in reference to step 34. For example, mobile individual 12 may desire to modify the designated schedule upon acknowledging the receipt of the communication signal from security service system 10. In addition or alternatively, mobile individual 12 may desire to modify the location, time frame or other information stored within security service system 10 upon acknowledging the receipt of the communication signal from the security service system. In any case, the receipt of a reply other than a designated reply may coincide with step 52 in FIG. 3 in which receipt of communication signals transmitted from security service system 10 are acknowledged by mobile individual 12. As noted above, step 52 may include acknowledging communication signals transmitted from security service system 10 by transmitting a designated reply, but such a step may also acknowledge the receipt of transmitted communication signals by communicating a distress reply or any other reply distinct from the designated reply.

Returning to step 38, in the event no reply is received in response to the communication signal transmitted in step 32, the method may continue to step 40 in which security service system 10 retransmits the communication signal to communication device 14. Such a step may offer a chance for mobile individual 12 to acknowledge receipt of the communication signal from security service system 10 in the event that the individual was unable to acknowledge the first transmission of the communication signal due to circumstances unrelated to the safety of the individual. Consequently, step 40 may aid in preventing unnecessary notification and communication to responsive entity 16. As shown in FIG. 2, subsequent to step 40, the method may continue to step 42 in which a determination of whether a designated reply has been received. Upon receipt of a designated reply or a reply indicating that the safety of mobile individual 12 is not in jeopardy, the method may continue to step 36 in which the transmission of communication signals in step 32 is delayed for a predetermined length of time. In the event in which a distress reply or no reply is received from mobile individual 12, the method may continue to step 44 in which location information is communicated to responsive entity 16. Alternatively, step 40 may be repeated a preset number of times before continuing on to step 44. Such a present number of times may be determined by security service system 10, mobile individual 12 or an entity representing mobile individual 12.

In general, responsive entity 16 may include any entity which is able to respond upon receipt of notification from security service system 10. For example, in some cases, responsive entity 16 may be a 911 public safety answering point (PSAP) associated with the location information received in step 30 and/or associated with the location of communication device 14. Since security service system 10 may be monitoring the safety of mobile individual 12 at different locations, it may be desirable for security service system 10, in some embodiments, to be able to directly contact the appropriate 911 PSAP upon indicating the safety of the individual is uncertain. More specifically, it may be advantageous for security service system 10 to be able to obtain and notify an appropriate 911 PSAP associated with location information of mobile individual 12, since contacting the correct emergency response agency will enable help to be sent to the required location more quickly. In particular, calling the correct 911 PSAP will avoid having the 911 PSAP associated with the location of security service system 10 from having to determine and contact the correct 911 PSAP.

Consequently, security service system 10 may include means 24 for obtaining an appropriate 911 PSAP associated with the location information received in step 30 and/or associated with the location of communication device 14. For example, in some embodiments, security service system 10 may render services from a geographical information service company such as Spatial Data, Inc. of Irving, Tex. to obtain an appropriate 911 PSAP. In such an embodiment, security service system 10 may be communicably coupled to the service via a transmission medium, such as a wire, cable, or wireless transmission link. In other cases, means 24 may include a database detailing regions assigned to particular 911 PSAPs. Such a database may be accessed via a transmission medium or may be part of security service system 10.

In any case, a 911 PSAP associated with the location information received in step 30 and/or associated with the location of communication device 14 may be obtained at any point prior to the step of communicating location information to responsive entity 16 in step 44. In a preferred embodiment, the 911 PSAP associated with a location specified in step 30 may be determined prior to step 32 such that the information may be adequately available in case the safety of mobile individual 12 is deemed uncertain or in jeopardy. In some cases, the method may include obtaining all of the 911 PSAPs associated with the location information received in step 30. In yet other embodiments, the method may include obtaining 911 PSAPs only for the locations and time frames included in the designated schedule described above in reference to step 32.

In some cases, responsive entity 16 may additionally or alternatively include an entity other than a 911 PSAP. Consequently, responsive entity 16 may include one or more responsive entities. For example, in some cases, responsive entity 16 may additionally or alternatively include a relative, a friend, a neighbor, or any other entity which may be able to render care to mobile individual 12. For instance, in some cases, a relative, friend or neighbor may be called to check on the status of an elderly or sickly individual who is not responding to a communication signal transmitted to a communication device of the individual. In addition or alternatively, responsive entity 16 may include a security guard or security service assigned to the location or region at which the mobile individual 12 has indicated to be during a particular time frame. For example, in an embodiment in which mobile individual 12 is at a college campus, responsive entity 16 may include campus security. In some cases, contacting a responsive entity other than or in addition 911 emergency personnel may be particularly advantageous. For example, in embodiments in which a responsive entity other than a 911 PSAP is contacted, the responsive entity may be able to render aid to mobile individual 12 before the 911 emergency personnel are able to come to the scene. In other cases, the responsive entity may be able to render care to mobile individual 12 without having to have 911 emergency personnel respond, preventing unnecessary communication to 911 PSAPs.

In embodiments in which responsive entity 16 includes a plurality of entities, the notification of such entities may be conducted simultaneously or consecutively. In some embodiments, contacting additional responsive entities may be delayed a predetermined length of time such that a first responsive entity can assess the severity of the situation involving mobile individual 12. For example, in an embodiment in which an elderly individual has not acknowledged communication signals transmitted to their communication device, a relative may be contacted to check up on the individual before a another responsive entity is notified. Upon determining the elderly individual is safe, the relative may contact security service system 10 to cancel any further notification of responsive entities. In an embodiment in which the elderly individual is hurt or not safe, however, the relative may contact security service system 10 to indicate another responsive entity should be notified. Alternatively, the relative may directly contact another responsive entity. In the event, the relative does not contact security service system 10 after a predetermined amount of time, security service system 10 may notify another responsive entity. In some cases, the order in which the plurality of responsive entities are notified may be predetermined.

In some cases, mobile individual 12 or an entity representing mobile individual 12 may designate the one or more responsive entities to be notified. For example, in some embodiments, the designation of responsive entity 16 may be communicated during step 50 along with the location and time frame information. In other embodiments, the designation of the one or more responsive entities may be communicated prior to or subsequent to step 50. In general, it may be desirable for mobile individual 12 to designate responsive entity 16 prior to the transmission of communication signals in step 32 such that notification of the responsive entity may not be delayed. For example, in some cases, the designation of one or more responsive entities may be communicated with the physical, medical, and/or historical information specific to mobile individual 12. In other embodiments, however, mobile individual 12 may designate responsive entity 16 upon indicating their safety is in jeopardy, such as during a distress reply.

In yet other cases, mobile individual 12 may not designate responsive entity 16. Rather, security service system 10 may designate responsive entity 16. Such a designation may be determined by predetermined criteria set by the security service system 10, mobile individual 12 or an entity representing mobile individual 12. For example, the one or more responsive entities to be notified may depend on the location information and/or time frame during which the safety of mobile individual 12 is uncertain. Consequently, in some cases, security service system 10 may designate different responsive entities to be notified, depending on the criteria of the situation. Alternatively, security service system 10 may designate the same responsive entity to be notified in the event the safety of mobile individual 12 is determined to be uncertain.

In any case, security service system 10 may include means 22 with which to notify one or more responsive entities as shown in FIG. 1. More specifically, security service system 10 may include means 22 with which to send communication signals to responsive entity 16. For example, means 22 may include one or more communication devices, such as a telephone, a computer with a web-based communication link, or any other device from which a communication signal can be transmitted. In this manner, the notification of responsive entity 16 may be verbal, written, and/or electronic. More specifically, means 22 may include a means with which to communicate information through an automated means or through a live operator. In cases in which responsive entity 16 is a 911 PSAP, however, the notification may have to be communicated verbally based upon the current regulations of 911 use. In addition, it may be advantageous for such a communication to be transmitted via a live operator such that questions asked by the 911 operator may be answered. In any case, means 22 may be communicably coupled to responsive entity 16 through a transmission medium such as a wire, cable, or wireless transmission link. Consequently, means 22 may include wired and/or wireless communication devices.

As stated above, step 44 may include communicating location information to responsive entity 16. Such location information may include the location information received in step 30 corresponding to the time frame during which a designated reply was not received. In another embodiment, however, the location information may additionally or alternatively include the location of communication device 14. Such an adaptation may be particularly advantageous in the event mobile individual 12 is not at the location specified in step 30 or in an embodiment in which location information for a particular time frame has not been received. Determining the location of communication device 14 may necessitate communication device 14 to have a global positioning system included therein. In addition, security service system 10 may need to be able to locate communication device 14 based upon signals received from such a global positioning system. More specifically, security service system 10 may include means 28 with which to determine the location of communication device 14. In this manner, the method may, in some embodiments, further include step 48 in which the location of communication device 14 is determined.

As shown in FIG. 2, step 48 may be interposed between steps 30 and 32. However, such a position of step 48 within the method is exemplary as indicated by the dotted lines connecting step 48 to steps 30 and 32. In general, step 48 may be conducted at any point within the method. For example, in some cases, step 48 may be conducted at a point in which the safety of mobile individual 12 is deemed uncertain or in jeopardy, such as just before, during, or subsequent to step 44. In other cases, step 48 may be conducted throughout the method such that the location of communication device 14 may be tracked. In any case, security service system 10 and the method of FIG. 2 may be further adapted, in some embodiments, to transmit communication signals to communication device 14 upon determining the communication device is a predetermined distance from the location specified for a particular time frame in step 30, regardless of whether the specified location and time frame is included within the designated schedule. In some embodiments, security service system 10 and the method of FIG. 2 may be adapted to directly notify responsive entity 16 upon determining communication device 14 is a predetermined distance from the location specified for a particular time frame in step 30.

In either case, such adaptations may allow security service system 10 to provide a more effective personal security system to mobile individual 12. In particular, the ability of being able to track communication device 14 and determine when the device is a predetermined distance from an intended location may allow the safety of mobile individual 12 to be monitored more closely. In some cases, the ability of security service system 10 to determine when the device is a predetermined distance from an intended location, in some embodiments, be specifically selected by mobile individual 12. In other words, mobile individual 12 may select whether he/she wants security service system 10 to track communications device 14 and/or notify responsive entity 16 if communication device 14 is a predetermined distance away from a specified location. As such, in some embodiments, the method of FIG. 2 may not include step 48. In addition, security service system 10 may not include means 28, in some embodiments.

Turning back to step 44, location information may be communicated to responsive entity 16. In addition, other information specific to mobile individual 12 may be communicated to responsive entity 16. In particular, any of the physical, historical, or medical information specific to mobile individual 12 stored within security service system 10 may be communicated to responsive entity 16. Such a transfer of information may advantageously enable responsive entity 16 to render aid to mobile individual 12 in a more efficient manner. As such, security service system 10 may include means 26 with which to communicate information to responsive entity 16. In general, the information specific to mobile individual 12 may be in written or electronic form. For example, in some embodiments, security service system 10 may have a picture of mobile individual. In other embodiments, security service system 10 may be a written record of information specific to mobile individual 12. As such, the information communicated to responsive entity 16 may be communicated in written, verbal, or electronic form. In particular, information may be communicated in person, over a telephone (i.e., verbally or through an automated touch-tone system), via facsimile, through email, via a web-based link, or any other known method of communication. As such, means 26 may include any device which is adapted to communicate information in written, verbal, and/or electronic form. For example, means 26 may include a telephone, a facsimile machine, a computer with a web-based communication link, or any other device to which a communication signal can be received. In addition, means 26 may be communicably coupled to responsive entity 16 through a transmission medium such as a wire, cable, or wireless transmission link.

It will be appreciated to those skilled in the art having the benefit of this disclosure that this invention is believed to provide a security system to a mobile individual. Further modifications and alternative embodiments of various aspects of the invention will be apparent to those skilled in the art in view of this description. For example, although some examples recited herein are directed at embodiments including a real estate agent, the security system described herein may be used and provided for any individual, regardless of their profession. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A method of providing a security system to a mobile individual, comprising:

receiving information regarding a set of different locations and corresponding time frames specific to the mobile individual;

transmitting a communication signal to a communication device during at least one of the time frames based upon a designated schedule; and determining a subsequent course of action based upon whether a designated reply has been received in response to the transmitted communication signal, wherein the subsequent course of action comprises:

communicating location information to a responsive entity upon failing to receive the designated reply; and not communicating location information to the responsive entity upon receiving the designated reply.

2. The method of claim 1, wherein the step of communicating comprises communicating a location associated with a time frame in which the communication signal was transmitted.

3. The method of claim 1, wherein the step of communicating comprises communicating a location of the communication device.

4. The method of claim 1, wherein the step of communicating comprises contacting a 911 public safety answering point associated with the location information.

5. The method of claim 4, further comprising obtaining the 911 public safety answering point prior to the step of communicating.

6. The method of claim 1, wherein the step of communicating comprises contacting a responsive entity other than a 911 emergency service.

7. The method of claim 1, further comprising communicating the location information to one or more additional responsive entities upon failing to receive a designated reply in response to the transmitted communication signal.

8. The method of claim 1, further comprising receiving the designated schedule from a user of the communication device.

9. The method of claim 1, further comprising determining the designated schedule based upon the received information.

10. The method of claim 1, further comprising receiving updated information regarding the set of different locations and corresponding time frames.

11. The method of claim 10, further comprising adjusting the designated schedule upon receiving the updated information.

12. The method of claim 1, further comprising receiving a termination signal to cancel the transmission of communication signals.

13. The method of claim 1, wherein the designated reply comprises a coded communication signal transmitted from the communication device.

14. The method of claim 1, wherein the designated reply comprises a verbal acknowledgement communicated from a user of the communication device.

15. The method of claim 1, wherein the communication device comprises a portable electronic communication device configured to operate from battery power.

16. The method of claim 15, wherein the portable electronic communication device comprises a wireless telephone.

17. The method of claim 16, wherein the portable electronic communication device comprises a pager.

18. The method of claim 15, wherein the portable electronic communication device comprises a computer.

19. The method of claim 15, wherein the portable electronic communication device comprises a global positioning system.

20. The method of claim 19, further comprising tracking a location of the portable electronic communication device.

21. The method of claim 20, further comprising transmitting a communication signal to the portable electronic communication device upon determining the location of the portable electronic communication device is a predetermined distance from a location specified within the received set of information for a corresponding time frame.

22. The method of claim 1, wherein the communication device comprises a communication device configured to operate from power directly supplied or converted from an alternating current source.

23. The method of claim 1, wherein the step of transmitting comprises periodically transmitting a communication signal to the communication device.

24. The method of claim 1, wherein the step of transmitting comprises transmitting a communication signal at substantially non-uniform intervals.

25. The method of claim 1, wherein the received information comprises a name of an establishment, and wherein the method further comprises determining an address for the establishment prior to the step of communicating.

26. The method of claim 1, wherein the step of receiving comprises receiving the information electronically.

27. The method of claim 1, wherein the step of receiving comprises receiving the information verbally.

28. The method of claim 1, wherein the step of receiving comprises receiving the information from a user of the communication device.

29. The method of claim 1, wherein the step of receiving comprises receiving the information from an entity other than a user of the communication device.

30. The method of claim 1, further comprising receiving information related to a user of the communication device.

31. The method of claim 30, wherein the step of communicating further comprises verbally communicating at least some of the user-related information to the responsive entity.

32. The method of claim 30, wherein the step of communicating further comprises electronically communicating at least some of the user-related information to the responsive entity.

33. The method of claim 1, wherein the step of communicating comprises notifying a 911 public safety answering point associated with the location of the portable electronic communication device.

34. The method of claim 1, wherein the step of communicating comprises notifying an entity designated by the remotely located individual.

35. A method of using a portable personal security system, comprising:

communicating to a security service system a schedule of engagements arranged at locations remote from the security service system; and acknowledging receipt of signals transmitted from the security service system to a portable electronic communication device during a time frame specified for at least one of the engagements.

36. The method of claim 35, wherein the step of communicating further comprises designating one or more responsive entities to be notified in a case of an emergency.

37. The method of claim 35, wherein the step of communicating further comprises designating a schedule for the transmission of signals.

38. A security system, comprising:

a means for receiving and storing information regarding a set of different locations and corresponding time frames;

a means for initiating communication links with a communication device during at least one of the time frames and at predetermined intervals; and a means for notifying a responsive entity of location information upon failing to receive a designated reply correlating to one or more of the initiated communication links.

39. The security system of claim 38, further comprising a means for obtaining a 911 public safety answering point associated with the location information.

40. The security system of claim 38, wherein the location information comprises a name of an establishment, and wherein the security service system further comprises a means to determine an address of the establishment.

41. The security system of claim 38, wherein the means for receiving and storing information is adapted to store information specific to a user of the communication device.

42. The security system of claim 41, further comprising a means to verbally transfer the information specific to the user of the communication device to the responsive entity upon failing to receive a designated reply correlating to one or more of the initiated communication links.

43. The security system of claim 41, further comprising a means to electronically transfer the information specific to the user of the portable electronic communication device to the responsive entity upon failing to receive a designated reply correlating to one or more of the initiated communication links.

44. The security system of claim 38, further comprising a means to receive an initial signal of a communication link from the communication device and maintain the communication link until receiving a termination signal.

45. The security system of claim 38, further comprising a means to track the communication device.

46. The security system of claim 45, further comprising:

a means for comparing the location of the communication device with a location specified for a particular time frame; and a means for initiating a communication link with the communication device upon determining the communication device is a set distance from the specified location.

* * * * *

UNITED STATES PATENT AND TRADEMARK OFFICE

CERTIFICATE OF CORRECTION

PATENT NO. : 7,026,928 B1
APPLICATION NO. : 10/393860
DATED : April 11, 2006
INVENTOR(S) : Lane It is certified that error appears in the above-identified patent and that said Letters Patent is hereby corrected as shown below:

In the Claims

Col. 21, line 7: please delete "claim 16" and substitute therefor -- claim 15 --.

Signed and Sealed this

Nineteenth Day of December, 2006

JON W. DUDAS
*Director of the United States Patent and Trademark Office*